(12) United States Patent
Annes

(10) Patent No.: US 7,628,562 B2
(45) Date of Patent: Dec. 8, 2009

(54) CONNECTOR FOR SASH WINDOW FRAME MEMBERS

(75) Inventor: Jason L. Annes, Chicago, IL (US)

(73) Assignee: Newell Operating Company, Atlanta, GA (US)

( * ) Notice: Subject to any disclaimer, the term of this patent is extended or adjusted under 35 U.S.C. 154(b) by 729 days.

(21) Appl. No.: 11/166,769

(22) Filed: Jun. 24, 2005

(65) Prior Publication Data
US 2007/0011961 A1 Jan. 18, 2007

(51) Int. Cl.
F16B 2/22 (2006.01)

(52) U.S. Cl. ............ 403/329; 403/397; 52/656.9

(58) Field of Classification Search .......... 52/58, 52/60, 211, 208, 204.53, 586.1, 582.1, 584.1, 52/586.2, 585.1, 845, 848, 656.9, 656.5, 52/656.4; 403/329, 397, 298, 300, 301, 108, 403/292, 405.1, 294, 295, 286; 411/477, 411/478, 907, 908

See application file for complete search history.

(56) References Cited

U.S. PATENT DOCUMENTS

| | | | | | |
|---|---|---|---|---|---|
| 1,775,780 | A | * | 9/1930 | Papalas | 52/714 |
| 1,920,021 | A | * | 7/1933 | Schroeder | 403/290 |
| 2,555,562 | A | * | 6/1951 | Bales | 24/581.1 |
| 2,556,977 | A | * | 6/1951 | Paige | 285/154.1 |
| 3,048,812 | A | * | 8/1962 | Heidler | 439/825 |
| 3,191,243 | A | * | 6/1965 | Ferberg et al. | 403/281 |
| 3,214,802 | A | * | 11/1965 | Davis | 403/280 |
| 3,764,177 | A | * | 10/1973 | Woodward | 296/43 |
| 4,095,827 | A | | 6/1978 | Stavenau | |
| 4,225,257 | A | * | 9/1980 | Andreaggi | 403/24 |
| 4,266,371 | A | | 5/1981 | Erdman et al. | |
| 4,362,353 | A | * | 12/1982 | Cobaugh et al. | 439/825 |
| 4,617,758 | A | | 10/1986 | Vetter | |
| 4,679,352 | A | | 7/1987 | Bates | |
| 4,773,280 | A | * | 9/1988 | Baumgarten | 403/197 |
| 4,860,493 | A | | 8/1989 | Lense | |
| 4,870,797 | A | * | 10/1989 | Hagemeyer | 52/455 |
| 4,887,392 | A | * | 12/1989 | Lense | 49/300 |
| 4,922,587 | A | * | 5/1990 | Pettit | 24/453 |
| 4,937,976 | A | | 7/1990 | Tucker et al. | |
| 5,043,528 | A | * | 8/1991 | Mohr | 174/355 |
| 5,083,409 | A | * | 1/1992 | Pliml, Jr. | 52/656.9 |
| 5,127,762 | A | * | 7/1992 | Havlovitz | 403/298 |
| 5,144,780 | A | * | 9/1992 | Gieling et al. | 52/298 |
| 5,289,656 | A | | 3/1994 | Vetter | |
| 5,313,737 | A | | 5/1994 | Midas | |
| 5,408,796 | A | * | 4/1995 | Hashimoto et al. | 52/489.2 |
| 5,431,211 | A | * | 7/1995 | Guillemet | 160/381 |
| 5,439,308 | A | * | 8/1995 | Beaulieu | 403/292 |
| 5,440,839 | A | | 8/1995 | Piltingsrud | |
| 5,467,254 | A | * | 11/1995 | Brusati et al. | 361/799 |

(Continued)

Primary Examiner—Gay Ann Spahn
Assistant Examiner—Joshua K. Ihezie
(74) Attorney, Agent, or Firm—Banner & Witcoff, Ltd.

(57) ABSTRACT

A connector for joining frame members of a window assembly is provided. Each frame member has a channel to receive the connector. The connector comprises a pair of spaced longitudinal members and a pair of transverse members attached to the longitudinal members to form a frame. The frame has a front wall and a rear wall. The connector has at least one flexible finger extending from one of the longitudinal members towards the other longitudinal member, wherein a clearance exists between a free end of the finger and the other longitudinal member.

13 Claims, 8 Drawing Sheets

U.S. PATENT DOCUMENTS

| | | | |
|---|---|---|---|
| 5,493,813 A | 2/1996 | Vetter et al. | |
| 5,560,731 A * | 10/1996 | Kronenberg | 403/298 |
| 5,564,952 A * | 10/1996 | Davis | 439/682 |
| 5,590,491 A | 1/1997 | Piltingsrud | |
| 5,694,730 A * | 12/1997 | Del Rincon et al. | 52/586.1 |
| 5,741,031 A | 4/1998 | Bauman et al. | |
| 5,806,900 A | 9/1998 | Bratcher et al. | |
| 5,813,171 A | 9/1998 | Piltingsrud | |
| 5,927,389 A * | 7/1999 | Gonsalves et al. | 165/121 |
| 5,938,010 A * | 8/1999 | Osterbye | 206/38 |
| 6,044,587 A | 4/2000 | Vetter et al. | |
| 6,128,858 A | 10/2000 | Vetter et al. | |
| 6,155,615 A | 12/2000 | Schultz | |
| 6,233,888 B1 * | 5/2001 | Wu | 52/207 |
| 6,332,618 B1 * | 12/2001 | Karlsson | 277/648 |
| 6,347,902 B1 * | 2/2002 | Loh | 403/298 |
| 6,374,557 B1 | 4/2002 | O'Donnell | |
| 6,406,213 B1 * | 6/2002 | Dohman et al. | 403/298 |
| 6,568,873 B1 * | 5/2003 | Peterson | 403/305 |
| 6,675,545 B2 * | 1/2004 | Chen et al. | 52/586.1 |
| 6,709,187 B2 * | 3/2004 | Loh | 403/298 |
| 6,729,091 B1 * | 5/2004 | Martensson | 52/391 |
| 6,915,609 B2 | 7/2005 | O'Donnell et al. | |
| 7,452,249 B2 * | 11/2008 | Daily et al. | 439/825 |
| 2005/0023813 A1 * | 2/2005 | Biglino | 280/743.2 |

* cited by examiner

CONNECTOR FOR SASH WINDOW FRAME MEMBERS

CROSS-REFERENCE TO RELATED APPLICATIONS

Not applicable.

FEDERALLY SPONSORED RESEARCH OR DEVELOPMENT

Not applicable.

TECHNICAL FIELD

The present invention relates to a connector for use in connecting distinct frame members of a closure member. More specifically, the present invention relates to a connector for securely joining a trim member to a frame member of a window or a door assembly.

BACKGROUND OF THE INVENTION

Closure members, meaning door assemblies (including sliding doors and swinging doors) and window assemblies (including sash windows and casement windows) are well known. When a closure member is installed, a variety of trim members are utilized to improve the aesthetic appearance of the closure member. These trim members are often affixed directly to the support members that comprise the frame assembly, where the frame assembly operably supports the door or window of the closure member. Traditionally, trim members are made from wood, plastic, and metal or a combination thereof. With most closure members, trim members are installed within the home, dwelling, or building such that they are highly visible.

A variety of methods of installing trim members have been utilized. One method of installing trim members to support members is to use fasteners such as nail, screws, rivets or bolts. One disadvantage of such installation is the unsightly appearance of a portion of the fastener after installation is complete. Another disadvantage of such installation is the destructive nature of the installed fastener as it engages a portion of the support member.

A second traditional method of installing trim members involves the use of an adhesive such as a glue, epoxy or other bonding agent. The adhesive is typically placed between the trim member and support member thereby forming a bond between the two. A disadvantage of such an installation is the destructive nature of the connection. If the trim member needs to be removed for maintenance or repair to the closure member, the removal will cause damage to either or both of the trim member and closure member. Also, incomplete removal of the adhesive is problematic in that a residue remains.

Therefore, a need exists for an improved connector for joining trim members to support members that is non-destructive, allowing the trim member to be selectively removed from the support member without damage, and simultaneously strong enough to connect the trim member to the support member without a risk of disconnection. The connector of the present invention is provided to solve these and other problems.

SUMMARY OF THE INVENTION

The present invention relates to a connector for joining frame members of a closure assembly. The closure assembly can be a door assembly, a window assembly, or a variety of other closure assemblies. The closure assembly generally includes a frame assembly and a closing member operably connected to the frame assembly. The frame assembly comprises a plurality of structural frame members and aesthetic trim members. Both the trim member and structural member have a channel adapted to receive a portion of the connector.

The connector generally comprises a pair of longitudinal members and a pair of transverse members connected together to form a frame. The frame of the connector has a front wall and a rear wall. The front wall generally forms a plane. The rear wall generally forms a second plane parallel to the plane of the front wall. The connector further comprises a plurality of ribs extending between the longitudinal members of the frame. The connector further has a plurality of flexible curvilinear fingers, each finger extending from one longitudinal member towards the other. Each finger has a first surface generally facing the front wall of the frame and a second surface generally facing the rear wall of the frame. At least a portion of the first surface of each finger extends beyond the front wall. Stated differently, at least a portion of the first surface of each finger intersects the plane formed by the front wall. The connector is configured to be forcibly inserted in each of the channels of the trim member and support member.

According to one aspect of the invention, the connector has four fingers and three ribs. The fingers and ribs are alternately positioned between the two transverse members of the frame. Two of the fingers extend from one of the longitudinal members while the other two fingers extend from the other longitudinal member. Each of the fingers is "S-shaped."

According to another aspect of the invention, the connector has four fingers and one rib. The rib is positioned in between the two transverse members of the frame. Two fingers are positioned between the rib and one transverse member while the other two fingers are positioned between the rib and the other transverse member. Each of the fingers is "C-shaped".

According to yet another aspect of the invention, the connector has a base, a first surface and a generally opposite second surface. The connector also has a first end and a second end. The first surface of the connector includes a plurality of teeth positioned equally at the first end and second end. The first surface has a generally concave curvilinear configuration. The second surface of the connector includes a plurality of engagement surfaces located proximate the first end and second end.

According to yet another aspect of the invention, the connector has a longitudinal member and two fingers. The longitudinal member has a first surface, a second surface, a first end and a second end. The first finger extends from the first end of the first surface of the connector. The second finger extends from the second end of the second surface of the connector. Thus the fingers extend in opposite directions. Each finger includes a free end away from the longitudinal member. Each finger has a curvilinear configuration. Each finger has thickness and an overall width. The thickness of the finger at all points is less than the overall width of the finger.

According to yet another aspect of the invention, the connector has a longitudinal member and two fingers. The longitudinal member has a first surface, a second surface, a first end and a second end. The first finger extends from the first end of the first surface of the connector. The second finger extends from the second end of the second surface of the connector. Thus the fingers extend in opposite directions. Each finger includes a free end away from the longitudinal member. The free end of each finger has a pair of protrusions on opposite sides of the finger adapted to engage the interior surface of the channels of the trim member and support member. Each finger has a generally straight configuration. Each finger has thickness and an overall width. The thickness of the finger at all points is less than the overall width of the finger.

DETAILED DESCRIPTION

While this invention is susceptible to embodiment in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figures 1, 1A, 1B:
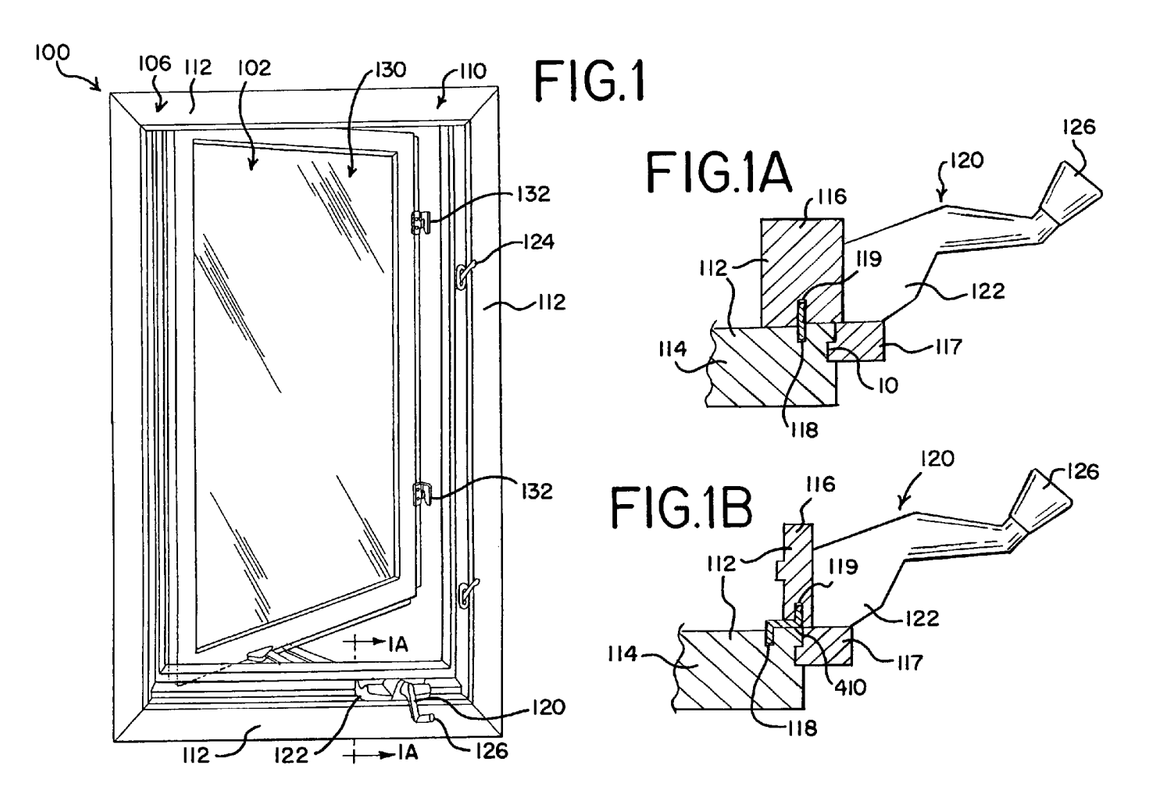
FIG. 1 is front view of a closure assembly, specifically a casement window assembly.
FIG. 1A is a cross-section of a support member and trim member of the casement window assembly of FIG. 1 taken along line 1A-1A, and showing installation of the connector of the present invention.
FIG. 1B is a cross-section of a support member and trim member of the casement window assembly of FIG. 1 taken along line 1A-1A and showing installation of an alternate embodiment of the connector of the present invention.

A closure assembly 100 is generally shown in FIG. 1. Although the closure assembly 100 is shown as a casement window assembly, the closure assembly could be a window assembly or door assembly such as a sash window, casement window, swinging door, or sliding door. In general, each closure assembly 100 has a frame assembly 110, and a closing member 102 can be operably mounted to the frame assembly 110. The closing member 102 can be mounted in a variety of manners in the frame assembly 110. For example, the closing member 102 can be adapted to slide within the frame assembly 110, or alternatively, the closing member 102 can be hinged to the frame assembly 110. In the case of a closure assembly 100 which is a door assembly, the closing member 102 is a door mounted to the frame assembly 110 which is a door frame. As shown in FIG. 1, the closure assembly 100 is a casement window assembly 106, wherein the closing member 102 is the window assembly 130, as shown in FIG. 1. However, a variety of closure assemblies 100 and closing members 102 can be utilized without departing from the spirit of the present invention.

The casement window assembly 106 includes a frame assembly 110 and a window assembly 130. Two keepers 132 are mounted to the window assembly 130. The frame assembly 110 includes a plurality of frame members 112. The frame assembly 110 further includes a rotary device 120 adapted to move the window assembly 130 in the frame assembly 110 between an open and closed position. The rotary device 120 includes a base 122 and a spindle (not shown) extending outward from the base 122. The spindle is operably linked to the window assembly 130. The rotary device 120 further includes a rotary handle 126 mounted on the spindle. Rotation of the rotary handle 126 operates the rotary device 120 to move the window assembly 130 in the frame assembly 110. The frame assembly 110 further includes a lock assembly 124 for securing the window assembly 130 to the frame assembly 110.

Referring to FIGS. 1A and 1B, the frame assembly 110 has a plurality of frame members 112 which include support members 114 or trim members 116. Specifically, the support members 114 cooperate to form the frame assembly 110, and provide rigidity to support the frame assembly 110. The trim frame members 116 are connected to the support members 114 to primarily provide improved aesthetic appearance. However, the trim members 116 provide some structural support to the frame assembly 110. A second trim member 117 is shown extending from the support member 114 and generally positioned below the rotary device 120. Each support member 114 includes a slot or channel 118 extending along an extent of the length of the support member 114. Similarly, each trim member 116 includes a slot or channel 119 along an extent of the length of the trim member 116. The present invention relates to a connector 10 which provides an improved means for connecting a trim member 116 to a support member 114. In general terms, the connector 10 is positioned within the channels 118, 119 to fixedly connect the trim and support members 114, 116. Several preferred embodiments of the connector 10 of the present invention are illustrated in FIGS. 1-21.

Figure 2:
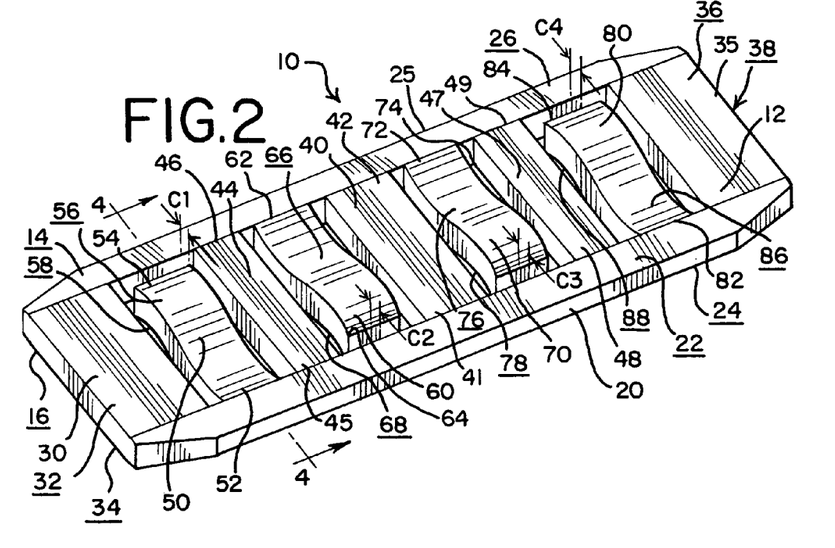
FIG. 2 is a perspective view of a first embodiment of the connector.

Referring to FIGS. 2-7, a first embodiment of the connector 10 of the present invention is illustrated. The connector 10 generally comprises a frame and a plurality of ribs and fingers. The frame 12 comprises two longitudinal members 20, 25 and two transverse members 30, 35 which are connected proximate their respective ends. The first longitudinal member 20 is generally parallel to the second longitudinal member 25, as shown in FIG. 2. Likewise, the first transverse member 30 is generally parallel to the second transverse member 35. The four members 20, 25, 30, 35 cooperate to form the frame 12 of the connector 10 and define the perimeter of the connector 10. Although the longitudinal members 20, 25 are shown as generally longer than the transverse members 30, 35, it is understood that the transverse members 30, 35 can be longer than the longitudinal members 20, 25. The length and geometry of the members 20, 25, 30, 35 will vary with the configurations and design of the connector 10, the channels 118, 119 and the closure assembly 100.

The first longitudinal member 20 has a first surface 22 and a generally opposed second surface 24. Similarly, the second longitudinal member 25 has a first surface 26 and a generally opposed second surface 28. The first surfaces 22, 26 of the longitudinal members 20, 25 generally face in the same direction on the connector 10, and the second surfaces 24, 28 of the longitudinal members 20, 25 generally face in the opposite direction of the first surfaces 22, 26. Likewise, the first transverse member 30 has a first surface 32 and a generally opposed second surface 34. The second transverse member 35 also has a first surface 36 and a generally opposed second surface 38. In the same fashion as the longitudinal members 20, 25, the first surfaces 32, 36 of the transverse members 30, 35 generally face in the same direction on the connector 10, and the second surfaces 34, 38 of the transverse members 30, 35 generally face in the opposite direction of the first surfaces 32, 36.

The longitudinal members 20, 25 and the transverse members 30, 35 forming the frame 12 further define a front wall 14 and a rear wall 16 of the connector 10. The front wall 14 of the connector 10 is formed by the first surfaces 22, 26 of the two longitudinal members 20, 25 and the first surfaces 32, 36 of the two transverse members 30, 35. The four first surfaces 22, 26, 32, 36 cooperate to define the front wall 14 of the connector 10. In the first embodiment shown in FIGS. 3-5, the front wall 14 generally defines a front plane. Similarly, the rear wall 16 of the connector 10 is formed by the second surfaces 24, 28 of the two longitudinal members 20, 25 and the second surfaces 34, 38 of the two transverse members 30, 35. The four second surfaces 24, 28, 34, 38 cooperate to form the rear wall 16 of the connector 10. The rear wall 16 of the connector 10 also generally forms a rear plane. The rear wall 16 is generally opposite the front wall 14, and the front and rear planes formed by the two walls 14, 16 are generally parallel.

As stated above, the frame 12 further comprises three ribs 40, 44, 47. The first rib 40 has a first end 41 and a second end 42. Similarly, the second rib 44 has a first end 45 and a second end 46, and the third rib 47 has a first end 48 and a second end 49. Each rib 40, 44, 47 extends from the first longitudinal member 20 to the second longitudinal member 25. Thus, the first ends 42, 45, 48 of all three ribs 40, 44, 47 are connected to the first longitudinal member 20 while the second ends 42, 46, 49 of all three ribs 40, 44, 47 are connected to the second longitudinal member 25. All three ribs 40, 44, 47 are located generally in between the first transverse member 30 and the second transverse member 35. Specifically, the first rib 40 is located proximate the midpoint of the two longitudinal members 20, 25. The second rib 44 is located between the first rib 40 and the first transverse member 30. Similarly, the third rib 47 is located between the first rib 40 and the second transverse member 35. The ribs 40, 44, 47 provide increased strength, rigidity and stability to the frame 20 and the connector 10. The number, location, and configuration of the ribs 40, 44, 47 will vary with the design parameters of the connector 10 and the closure assembly 100. For example, the frame 12 might only include one rib 40 positioned in the location of the first rib 40. Furthermore, it is understood that the frame 12 may not include any ribs at all. Rather, with the appropriate configuration of the longitudinal members 20, 25 and transverse members 30, 35, the frame 12 may achieve sufficient rigidity without the use of ribs 40, 44, 47.

The frame 12 also includes four generally flexible fingers 50, 60, 70, 80, as shown in FIGS. 2-7. Referring to FIG. 2, the first finger 50 is positioned between the first transverse member 30 and the first rib 44. The first finger 50 includes a fixed end 52 and a free end 54. The fixed end 52 of the first finger 50 is connected to the first longitudinal member 20. The free end 54 of the first finger 50 is proximate the second longitudinal member 25. Thus the first finger 50 extends from the first longitudinal member 20 generally towards the second longitudinal member 25. There exists a clearance C1 defined as the distance between the free end 54 of the first finger 50 and the second longitudinal member 25. The first finger 50 further includes a first surface 56 and a generally opposite second surface 58. The first surface 56 generally is oriented in the same direction as the front wall 14 of the frame 12. Similarly, the second surface 58 is oriented in the same direction as the rear wall 16 of the frame 12. Thus, the first surface 56 is generally opposite the second surface 58 of the finger 50.

Figure 3:
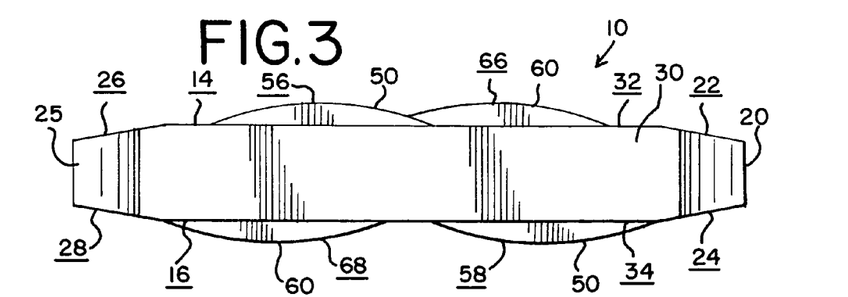
FIG. 3 is an end view of the connector of FIG. 2.
Figure 4:
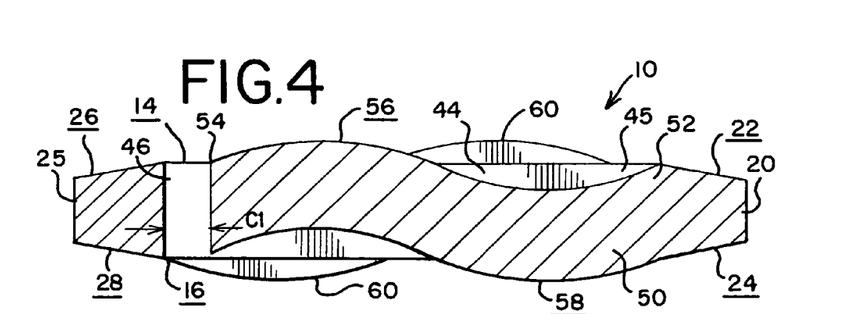
FIG. 4 is a cross-section of the connector of FIG. 2 taken along line 4-4.

As shown in FIGS. 3 and 4, the finger 50, including the first surface 56 and the second surface 58, has a curvilinear configuration. At least a portion of the first surface 56 extends beyond the first wall 14. Similarly, at least a portion of the second surface 58 extends beyond the rear wall 16. Likewise, because of the curvilinear configuration of the finger 50, at least a portion of the first surface 56 is recessed from the first wall 14. Thus, a portion of the first surface 56 is positioned between the first wall 14 and the second wall 58. Similarly, at least a portion of the second surface 58 is recessed from the rear wall 16. Thus, a portion of the second surface 58 is positioned between the front wall 14 and the rear wall 16. In the preferred embodiment shown, the finger 50 has an "S-shaped" configuration, however it is understood that the finger 50 can take on a variety of various curvilinear configurations without departing from the spirit of the present invention. For example, the finger 50 can have a "C-shaped" configuration. Furthermore, due to the "S-shape" in the preferred embodiment, both the first surface 56 and the second surface 58 extend beyond the walls 14, 16 of the frame 12. However, it is understood that only one portion of the finger 50 needs to extend past at least one of the walls 14, 16 of the frame to confront the channel 118 of the frame members 114, 116. It is also understood that more than one portion of the first and second surfaces 56, 58 can extend beyond the front and rear walls 14, 16 without departing from the spirit of the present invention. The shape and configuration of the finger 50 will vary depending upon the design parameters of the particular connector 10 and the closing assembly 100.

The second finger 60 is positioned between the first rib 40 and the second rib 44. The second finger 60 also includes fixed end 62 and a free end 64. The fixed end 62 of the second finger 60 is connected to the second longitudinal member 25. The free end 64 of the second finger 60 is proximate the first longitudinal member 20. Thus the second finger 60 extends from the second longitudinal member 25 generally towards the first longitudinal member 20. There exists a clearance C2 defined as the distance between the free end 64 of the second finger 60 and the first longitudinal member 20. The second finger 60 further includes a first surface 66 and a generally opposite second surface 68. The first surface 66 is oriented in the same direction as the front wall 14 of the frame 12. Similarly, the second surface 68 is oriented in the same direction as the rear wall 16 of the frame 12. The first surface 66 is positioned generally opposite the second surface 68 of the finger 60.

Like the first finger 50, the second finger 60 also has a curvilinear configuration. At least a portion of the first surface 66 extends beyond the first wall 14. Similarly, at least a portion of the second surface 68 extends beyond the rear wall 16. Likewise, because of the curvilinear configuration of the finger 60, at least a portion of the first surface 66 is recessed from the first wall 14. Thus, a portion of the first surface 66 is positioned between the first wall 14 and the second wall 68. Similarly, at least a portion of the second surface 68 is recessed from the rear wall 16. Therefore, a portion of the second surface 68 is positioned between the front wall 14 and the rear wall 16.

The third finger 70 is positioned between the first rib 40 and the third rib 47. The third finger 70 also includes fixed end 72 and a free end 74. The fixed end 72 of the third finger 70 is connected to the second longitudinal member 25. The free end 74 of the third finger 70 is proximate the first longitudinal member 20. As a result, the third finger 70 extends from the second longitudinal member 25 generally towards the first longitudinal member 20. There exists a clearance C3 defined as the distance between the free end 74 of the third finger 70 and the first longitudinal member 20. The third finger 70 further includes a first surface 76 and a generally opposite second surface 78. The first surface 76 is oriented in the same direction as the front wall 14 of the frame 12. Similarly, the second surface 78 generally faces in the same direction as the rear wall 16 of the frame 12. The first surface 76 is positioned generally opposite the second surface 78 of the finger 70.

Like the other fingers 50, 60 the third finger 70 also has a curvilinear configuration. At least a portion of the first surface 76 extends beyond the first wall 14. Similarly, at least a portion of the second surface 78 extends beyond the rear wall 16. Likewise, because of the curvilinear configuration of the finger 70, at least a portion of the first surface 76 is recessed from the first wall 14. Thus, a portion of the first surface 76 is positioned between the first wall 14 and the second wall 78. Similarly, at least a portion of the second surface 78 is recessed from the rear wall 16. Therefore, a portion of the second surface 78 is positioned between the front wall 14 and the rear wall 16.

The fourth finger 80 is positioned between the third rib 47 and the second transverse member 35. The fourth finger 80 also includes fixed end 82 and a free end 84. The fixed end 82 of the fourth finger 80 is connected to the first longitudinal member 20. The free end 84 of the fourth finger 80 is proximate the second longitudinal member 25. Thus the fourth finger 80 extends from the first longitudinal member 20 generally towards the second longitudinal member 25. There exists a clearance C4 defined as the distance between the free end 84 of the fourth finger 80 and the second longitudinal member 25. The fourth finger 80 further includes a first surface 86 and a generally opposite second surface 88. The first surface 86 is oriented in the same direction as the front wall 14 of the frame 12. Similarly, the second surface 88 generally faces in the same direction as the rear wall 16 of the frame 12. The first surface 86 is generally opposite the second surface 88 of the finger 80.

Like the other fingers 50, 60, 70, the fourth finger 80 also has a curvilinear configuration. At least a portion of the first surface 86 extends beyond the first wall 14. Similarly, at least a portion of the second surface 88 extends beyond the rear wall 16. Likewise, because of the curvilinear configuration of the finger 80, at least a portion of the first surface 86 is recessed from the first wall 14. Thus, a portion of the first surface 86 is positioned between the first wall 14 and the second wall 88. Similarly, at least a portion of the second surface 88 is recessed from the rear wall 16. Therefore, a portion of the second surface 88 is positioned between the front wall 14 and the rear wall 16.

It is understood that the number and configurations of the fingers 50, 60, 70, 80 may vary without departing from the spirit of the present invention. Although in the preferred embodiment shown in FIGS. 2-7 the connector 10 has four fingers 50, 60, 70, 80, greater or fewer fingers may be used. Also, even though the preferred embodiment has adjacent fingers 50, 60 extending in opposite directions, the direction of extension can vary so long as a portion of the fingers 50, 60, 70, 80 extends beyond either the first wall 14 or the second wall 16 to confront and cause interference with the channel 118. The number, shape, and configuration of the fingers will vary upon the design parameters of the connector 10 and the closure assembly 100.

Figures 5, 6, 7:
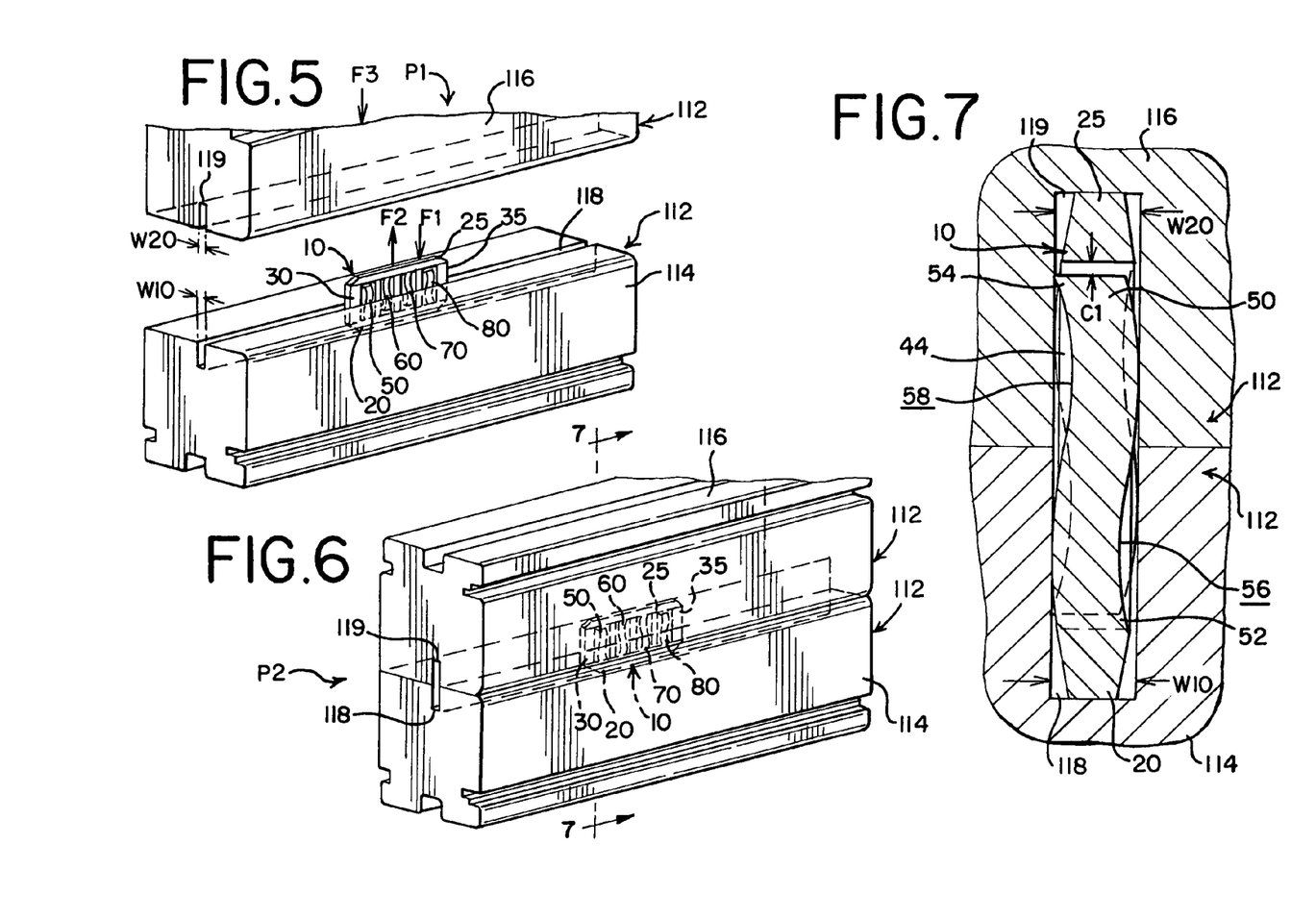
FIG. 5 is a perspective of the connector of FIG. 2 shown in a partially installed position with a trim member and a support member.
FIG. 6 is a perspective of the connector of FIG. 2 shown in an installed position.
FIG. 7 is a cross-section of the connector of FIG. 6 taken along line 7-7 showing the connector in the installed position.

As shown in FIGS. 5-7, the connector 10 is used to couple and connect one frame member 112 to another frame member 112. Typically, the connector 10 is employed to secure a trim member 116 to a support member 114. In FIGS. 5 and 6, a support member 114 is illustrated. The support member 114 has a channel 118 along an extent of the length of the support member 114. The channel 118 has a width W10 and the channel 118 is configured to receive a portion of the connector 10. Similarly, as shown in FIGS. 5 and 6, the trim member 116 has a channel 119 along an extent of the trim member 116. The channel 119 in the trim member 116 has a width W20 and the channel 119 is configured to receive another portion of the connector 10. The widths W10 and W20 of the two channels 118, 119 are shown to be approximately the same, however, it is understood that the widths of the two channels W10 and W20 can take on a variety of different configurations and dimensions, so long as each channel 118, 119 is adapted to receive a portion of the connector 10. When the connector 10 is utilized, it must be installed or inserted into both channels 118, 119 thereby connecting the trim member 116 and the support member 114.

FIG. 5 depicts a partially installed position P1 wherein the connector 10 is shown being installed in the support member 114 and the trim member 116 is not engaged with the support member 114. The frame 12 of the connector 10 is aligned such that the longitudinal members 20, 25 are generally parallel to the channel 118 of the support member 114. The first longitudinal member 20 is positioned proximate the channel 118 while the second longitudinal member 25 is positioned away from the channel 118. Thus, the two transverse members 30, 35 of the frame 12 are generally perpendicular to the channel 118 during installation. Once the frame 12 of the connector 10 is positioned near the channel 10 as explained herein, it can the be installed into the channel 118 by applying a downwardly directed force to the connector 10 in a direction generally perpendicular to the channel 118 as designated by the arrow F1 in FIG. 5. A force F1 in the direction indicated will cause the first longitudinal member 20 to be received by the channel 118 in an interference fit. As the connector 10 continues to be inserted into the channel 118 of the support member 114, the fingers 50, 60, 70, 80 confront the walls of the channel 118. Specifically, as shown in FIGS. 5-7, the first surfaces 66, 76 of the second finger 60 and third finger 70 confront the channel 118 nearest the front wall 14 of the connector 10. Similarly, the second surfaces 58, 88 of the first finger 50 and fourth finger 80 confront the channel 118 nearest the rear wall 16 of the connector 10. The confrontation between the fingers 50, 60, 70, 80 exerts a force on the fingers 50, 60, 70, 80 tending to flex the finger inward of the walls of the channel 118. Specifically, the first finger 50 and fourth finger 80 are flexed in a direction from the rear wall 16 towards the front wall 14. Similarly, the second finger 60 and the third finger 70 are flexed in a direction from the front wall 14 towards the rear wall 16. The fingers 50, 60, 70, 80 are resiliently connected to the frame 12 such that the fingers 50, 60, 70, 80 tend to resist this flexing motion. Thus each of the fingers 50, 60, 70, 80 when flexed exerts an opposite force outward on the walls of the channel 118. Specifically, the first finger 50 and the second finger 80 exert a force on the wall of the channel 118 in a direction from the front wall 14 to the rear wall 16. Similarly, the second finger 60 and the third finger 70 exert a force on the opposite wall of the channel 118 in a direction from the rear wall 16 towards the front wall 14.

These outward forces exerted by the fingers 50, 60, 70, 80 on the channel 118 cause an interference fit between the connector 10 and the channel 118 of the support member 114 such that the connector 10 is retained within the channel 118. However, the connector 10 is removably retained in the channel 118, meaning that the connector 10 may be disengaged and removed from the channel 118 by exerting an extraction force in a direction opposite to the installation force F1 shown in FIG. 5. Thus, the connector 10 is not permanently installed in the channel 118, but rather is removably installed in the channel 118. The degree of installation and extraction forces needed to install and uninstall the connector 10 depends upon the number and configuration of the fingers 50, 60, 70, 80, the geometry of the channel 118, and the degree of the interference fit caused by deflection of the fingers 50, 60, 70, 80. Thus, the installation and extraction forces will vary with the design parameters of the connector 10, including the fingers 50, 60, 70, 80, and the channel 118 of the support member 114.

Once the connector 10 is installed in the channel 118 of the support member 114, it is then similarly installed in the channel 119 of the trim member 116 to define the installed position P2 shown in FIG. 6. The frame 12 of the connector 10 is aligned such that the exposed second longitudinal member 25 is positioned proximate the channel 119. Thus, the two transverse members 30, 35 of the frame 12 are generally perpendicular to the channel 119 during installation. Once the frame 12 of the connector 10 is positioned near the channel 10 as explained herein, it can the be installed into the channel 119 by applying a force on the connector 10 in a direction generally perpendicular and into the channel 119 as designated by the arrow F2 in FIG. 5. Alternatively, a force F3, opposite the direction of F2, can be applied on the trim member 116 thereby force the channel 119 over the connector 10, and causing the connector 10 and channel 119 to mate, as seen in FIG. 6. A force F3 in the direction indicated will force the second longitudinal member 25 and the frame 12 into the channel 119. The force is exerted until the frame 12 is completely inserted into the channel 119, as shown in FIG. 6.

In a similar fashion, as the connector 10 continues to be inserted into the channel 119 of the trim member 116, the fingers 50, 60, 70, 80 confront the walls of the channel 119. Specifically, as shown in FIGS. 6 and 7, the second surfaces 68, 78 of the second finger 60 and third finger 70 confront the channel 118 nearest the rear wall 16 of the connector 10. Similarly, the first surfaces 56, 86 of the first finger 50 and fourth finger 80 confront the channel 119 nearest the front wall 14 of the connector 10. The confrontation between the fingers 50, 60, 70, 80 exerts a force on the fingers 50, 60, 70, 80 tending to flex the finger inward of the walls of the channel 119. Specifically, the first finger 50 and fourth finger 80 are flexed in a direction from the front wall 14 towards the rear wall 16. Similarly, the second finger 60 and the third finger 70 are flexed in a direction from the rear wall 16 towards the front wall 14. The fingers 50, 60, 70, 80 are resiliently connected to the frame 12 such that the fingers 50, 60, 70, 80 tend to resist this flexing motion. Thus each of the fingers 50, 60, 70, 80 when flexed exerts an opposite force outward on the walls of the channel 119. Specifically, the first finger 50 and the second finger 80 exert a force on the wall of the channel 118 in a direction from the rear wall 16 to the front wall 14. Similarly, the second finger 60 and the third finger 70 exert a force on the opposite wall of the channel 118 in a direction from the front wall 14 towards the rear wall 16.

These outward forces exerted by the fingers 50, 60, 70, 80 on the channel 119 cause an interference fit between the connector 10 and the channel 119 of the trim member 116 such that the connector 10 is retained within the channel 119. However, the connector 10 is removably retained in the channel 119 in that the connector 10 may be disengaged and removed from the channel 118 by exerting an extraction force to the trim member 116 in a direction opposite to the installation force F3 shown in FIG. 6. Thus, the connector 10 is not permanently installed in the channel 119, but rather is removably installed. The degree of installation and extraction forces needed to install and uninstall the connector 10 depends upon the number and configuration of the fingers 50, 60, 70, 80, the geometry of the channel, and the degree of the interference fit caused by deflection of the fingers 50, 60, 70, 80. Thus, the installation and extraction forces will vary with the design parameters of the connector 10, the fingers 50, 60, 70, 80, and the channel 119 of the particular trim member 116 being used.

In the installed position P2, the connector 10 is positioned between the members 114, 116 in their respective channels 118, 119. However, the trim member 116 is removably connected to the support member 114, as shown in FIG. 7. The fingers 50, 60, 70, 80 are compressed by the walls of the channels 118, 119 such that the fingers 50, 60, 70, 80 are flexed inward of the frame 12. In other words, the fingers 50, 60, 70, 80 are positioned substantially between the front wall 14 and the rear wall 16. The resilient fingers 50, 60, 70, 80 exert an outwardly directed force on the channels 118, 119 to cause an interference fit between the connector 10 and each of the members 114, 116 thereby securing the members 114, 116 in the installed position P2.

Figure 8:
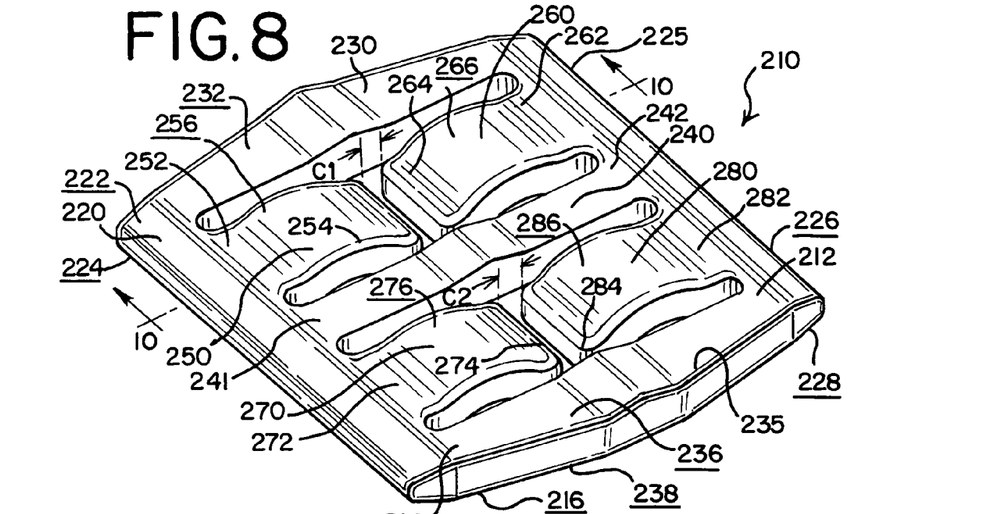
FIG. 8 is a perspective view of the first surface of the connector of a second embodiment of the invention.
Figure 9:
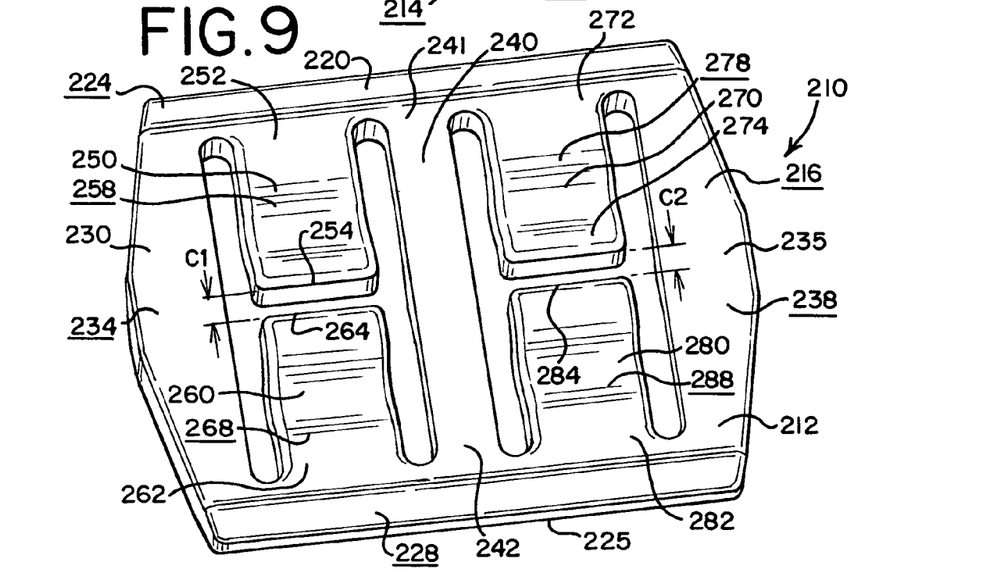
FIG. 9 is a perspective view of a second surface of the connector of FIG. 8.
Figure 10:
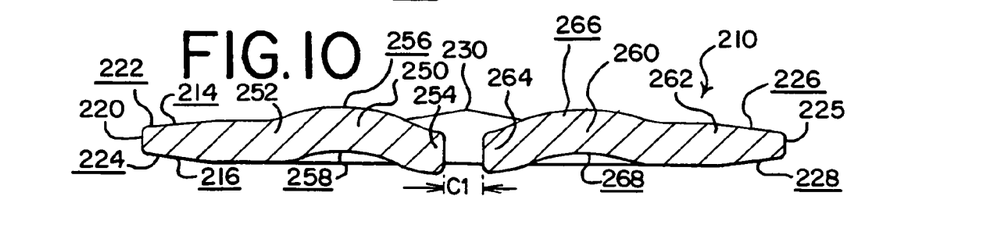
FIG. 10 is a cross-section of the connector of FIG. 8 taken along line 10-10.
Figure 11:
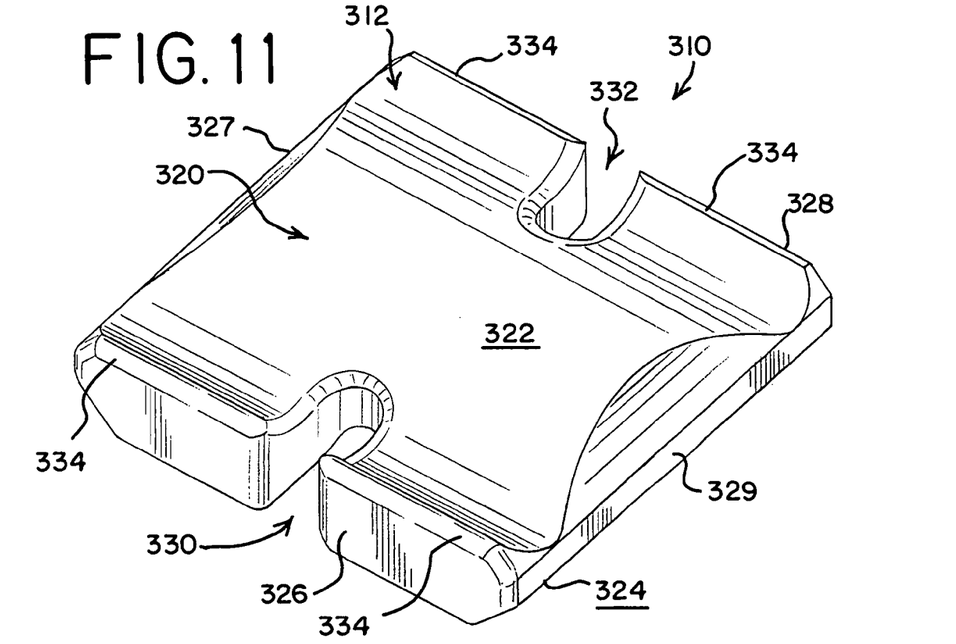
FIG. 11 is a perspective view of a first surface of the connector of a third embodiment of the invention.

The connector 10 can be formed from a variety of materials, including plastic, wood, or steel. Preferably, the connector 10 is formed from plastic such as a thermoplastic polymer or a thermosetting polymer. To enhance the resiliency and/or flexibility of the connector 10, a plasticizer can be added to the connector 10 formation process. The tensile and compressive strength of the connector 10 can be enhanced by adding a filler to the connector 10. The connector 10 can be formed from one of a variety of processes, including compression molding, injection molding, extrusion, blow molding, or casting. A second embodiment of the connector 210 is shown in FIGS. 8-10. There, the connector 210 comprises a frame 212, a rib 240, and a plurality of fingers 250, 260, 270, 280. The frame 212 comprises two longitudinal members 220, 225 and two transverse members 230, 235 which are connected proximate their respective ends. The first longitudinal member 220 is generally parallel to the second longitudinal member 225 and the first transverse member 230 is generally parallel to the second transverse member 235. The four members 220, 225, 230, 225 cooperate to form the frame 212 of the connector 210 (to define a perimeter of the connector 210).

The first longitudinal member 220 has a first surface 222 and a generally opposed second surface 224. Similarly, the second longitudinal member 225 has a first surface 226 and a generally opposed second surface 228. The first surfaces 222, 226 of the longitudinal members 220, 225 are generally oriented in the same direction on the connector 210, and the second surfaces 224, 228 of the longitudinal members 220, 225 are generally oriented in the opposite direction of the first surfaces 222, 226. Likewise, the first transverse member 230 has a first surface 232 and a generally opposed second surface 234. The second transverse member 235 also has a first surface 236 and a generally opposed second surface 238. In the same fashion as the longitudinal members 220, 225, the first surfaces 232, 236 of the transverse members 230, 235 are generally oriented in the same direction on the connector 210, and the second surfaces 234, 238 of the transverse members 230, 235 are generally oriented in the opposite direction of the first surfaces 232, 236.

The longitudinal members 220, 225 and the transverse members 230, 235 forming the frame 212 further define a front wall 214 and a rear wall 216 of the connector 210. The front wall 214 of the connector 210 is formed by the first surfaces 222, 226 of the two longitudinal members 220, 225 and the first surfaces 232, 236 of the two transverse members 230, 235. The four first surfaces 222, 226, 232, 236 cooperate to form the front wall 214 of the connector 210. The front wall 214 generally defines a front plane. Similarly, the rear wall 216 of the connector 210 is formed by the second surfaces 224, 228 of the two longitudinal members 220, 225 and the second surfaces 234, 238 of the two transverse members 230, 235. The four second surfaces 224, 228, 234, 238 cooperate to form the rear wall 216 of the connector 210. The rear wall 216 of the connector 210 also generally defines a rear plane. The rear wall 216 is generally opposite the front wall 214, and the planes formed by the two walls 214, 216 are substantially parallel.

The frame 212 further comprises a rib 240 having a first end 241 and a second end 242. The rib 240 extends from the first longitudinal member 220 to the second longitudinal member 225. Thus, the first end 241 of the rib 240 is connected to the first longitudinal member 220 while the second end 242 of the rib 240 is connected to the second longitudinal member 235. The rib 240 is located generally in between the first transverse member 230 and the second transverse member 235, approximately at the midpoint of the two longitudinal members 220, 225.

The frame 212 also includes four fingers 250, 260, 270, 280, as shown in FIGS. 8 and 9. Referring to FIG. 8, the first finger 250 and second finger 260 are positioned between the first transverse member 230 and the rib 240. The third finger 270 and the fourth finger 280 are located between the second transverse member 235 and the rib 240. Each of the fingers 250, 260, 270, 280 includes a fixed end 252, 262, 272, 282 and a free end 254, 264, 274, 284. The fixed ends 252, 272 of the first finger 250 and third finger 270 are connected to the first longitudinal member 220 while the fixed ends 262, 282 of the second finger 260 and fourth finger 280 are connected to the second longitudinal member 225. The free end 254 of the first finger 250 is proximate the free end 264 of the second finger 260 and the free end 274 of the third finger 270 is proximate the free end 284 of the fourth finger 280. There is a clearance C1 defined as the distance between the free end 254 of the first finger 250 and the free end 264 of the second finger 260. Similarly, there is a clearance C2 defined as the distance between the free end 274 of the third finger 270 and the free end 284 of the fourth finger 280. Each finger 250, 260, 270, 280 further includes a first surface 256, 266, 276, 286 and a generally opposite second surface 258, 268, 278, 288. The first surfaces 256, 266, 276, 286 generally face in the same direction as the front wall 214 of the frame 212. Similarly, the second surfaces 258, 268, 278, 288 generally face in the same direction as the rear wall 216 of the frame 212. The first surfaces 256, 266, 276, 286 are generally opposite the second surfaces 258, 268, 278, 288 of the fingers 250, 260, 270, 280.

Referring to FIGS. 8-10, the fingers 250, 260, 270, 280 each have a curvilinear configuration. At least a portion of each of the first surfaces 256, 266, 276, 286 extends beyond the front wall 214. Alternatively, at least a portion of each of the first surface 256, 266, 276, 287 extends beyond the rear wall 216. Likewise, because of the curvilinear configuration of the fingers 250, 260, 270, 280, at least a portion of each of the second surfaces 258, 268, 278, 288 is recessed from the first wall 214. Thus, a portion of each second surface 258, 268, 278, 288 is positioned between the front wall 214 and the rear wall 216. The fingers 250, 260, 270, 280 have a "C-shaped" configuration, however it is understood that the fingers 250, 260, 270, 280 can take on a variety of various curvilinear configurations without departing from the spirit of the present invention.

It is understood that the number and configurations of the fingers 250, 260, 270, 280 can vary without departing from the spirit of the present invention. Although FIGS. 8-10 depict the connector 210 having four fingers 250, 260, 270, 280, greater or fewer fingers may be used. Also, the fingers can extend in the same direction, opposite directions, or a variety of different directions, so long as a portion of the fingers 250, 260, 270, 280 extends beyond either the front wall 214 or the rear wall 216 to confront and cause interference with the channel 118. Consequently, the number, shape, and configuration of the fingers will vary upon the design parameters of the connector 210 and the closure assembly 100.

A third embodiment of the present invention is shown in FIGS. 11-15. There, the connector 310 generally comprises a body or base 312 having a central portion 320 with an upper surface 322 and a lower surface 324. The body 312 also has a first end 326 and a second end 328, as well as a first side 327 and a second side 329. The upper surface 322 of the base 312 has a generally convex or curvilinear configuration. The connector 310 has a pair of notches 330, 332 located in each end 326, 328 of the base 312. The first end 326 and the second end 328 of the base 312 each have an engaging surface defining a pair of teeth 334 extending from the upper surface 322. On the first end 326, one tooth 334 is located on either side of the notch 330. Similarly, on the second end 328, one tooth 334 is located on either side of the notch 332. Thus, the teeth 334 are positioned about the notches 330, 332.

Figure 12:
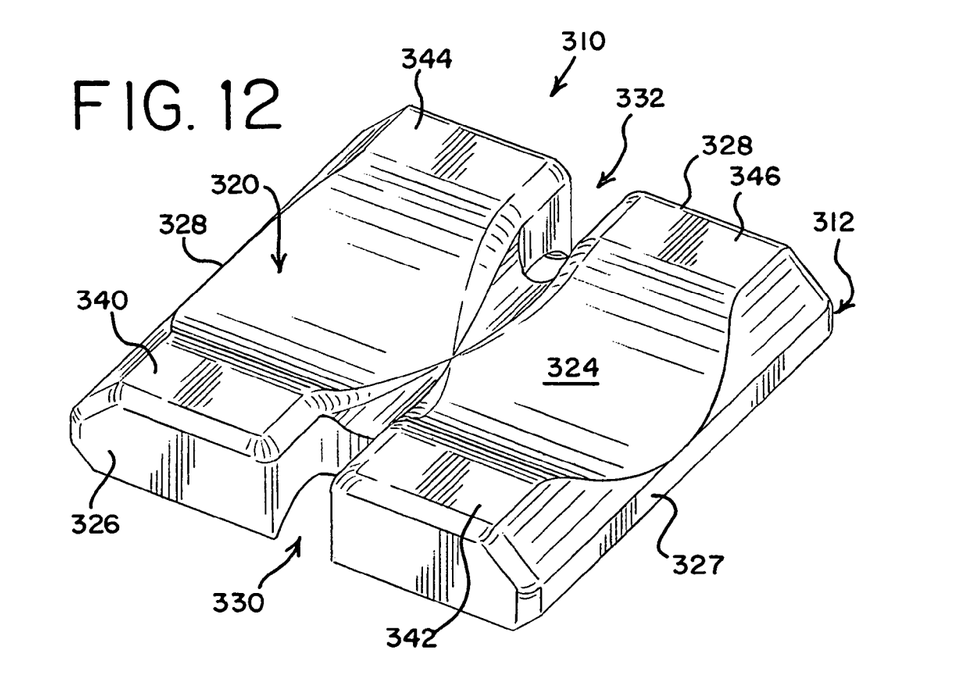
FIG. 12 is a perspective view of a second surface of the connector of FIG. 11.
Figure 13:
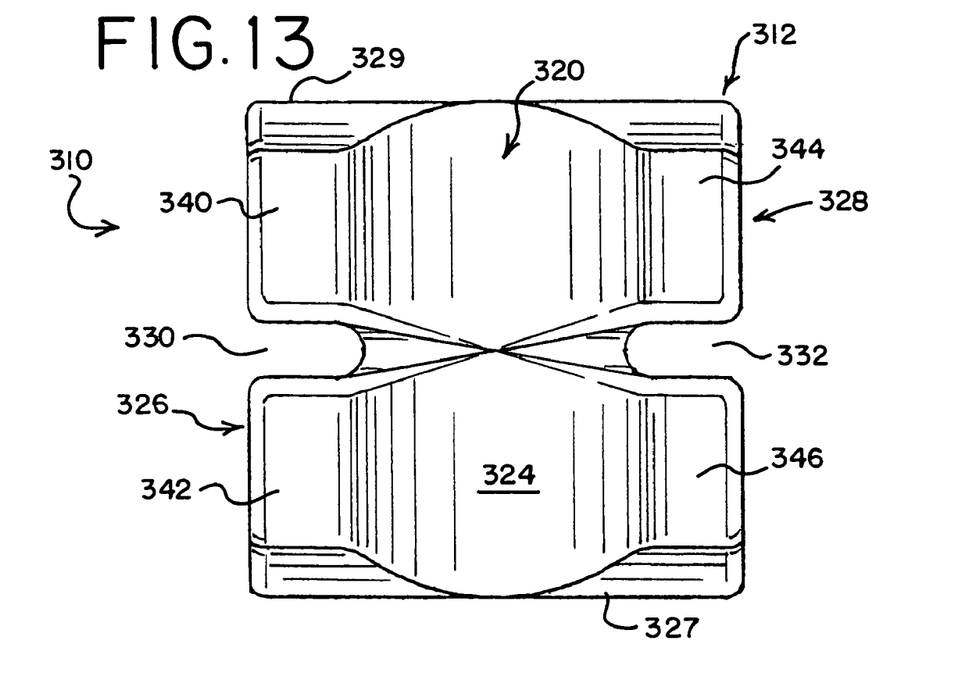
FIG. 13 is a bottom plan view of the connector of FIG. 1.
Figure 14:
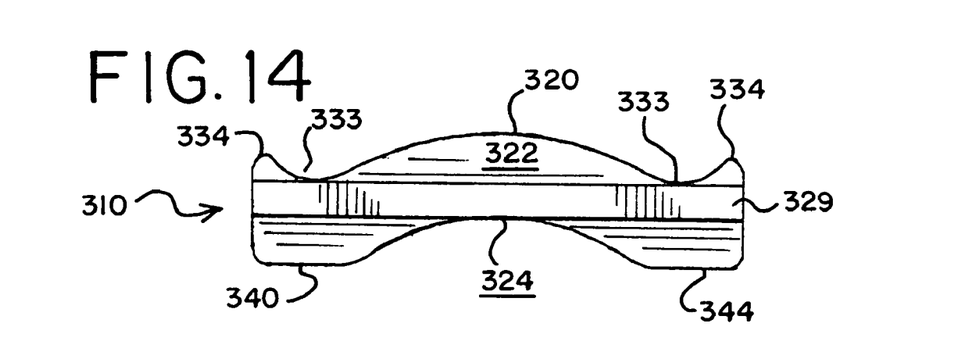
FIG. 14 is a side view of the connector of FIG. 11.
Figure 15:
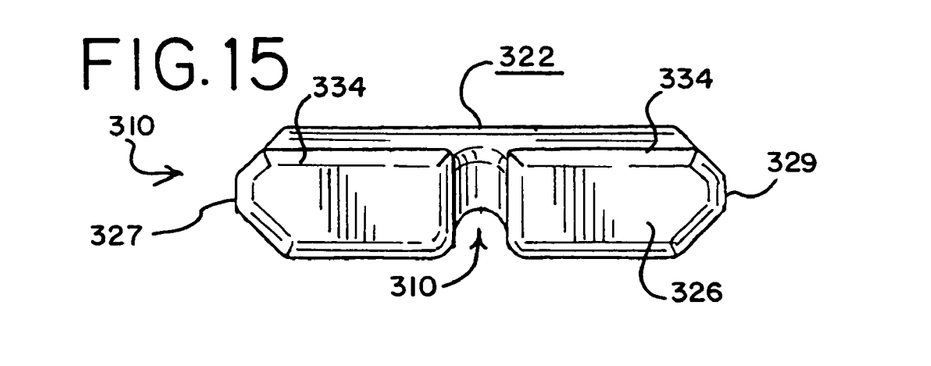
FIG. 15 is an end view of the connector of FIG. 1.

Referring to FIG. 12, the lower surface 324 includes four engagement surfaces 340, 342, 344, 346. Two engagement surface 340, 342 are located at the first end 326 of the base 312, one surface 340, 342 on either side of the notch 330. The other two engagement surfaces 344, 346 are located at the second end 328 of the base 312, one surface 344, 346 on each side of the notch 332. The lower surface 324 has a generally concave or curvilinear configuration as seen in FIG. 12. As shown in FIG. 12, a recess 333 is positioned between the convex central portion 320 and the teeth 334.

The flexible connector 310 is installed in a similar fashion as the preceding embodiments. One end 326, 328 of the connector 310 is forcibly inserted to the channel 118 of the support member 114 while the other end 326, 328 is forcibly inserted into the channel 119 of the trim frame member 116. The connector 310 flexes as it encounters the interior surfaces of the channels 118, 119. When installed, the four engagement surfaces 340, 342, 344, 346 frictionally engage the interior surfaces of the channels 118, 119. In a similar fashion, the four teeth 324 frictionally engage the opposing interior surfaces of the channels 118, 119. This combined frictional engagement operates to secure the trim member 116 to the support member 114 and thereby retain the members 114, 116 in the installed position P2.

Figures 16, 17, 18:
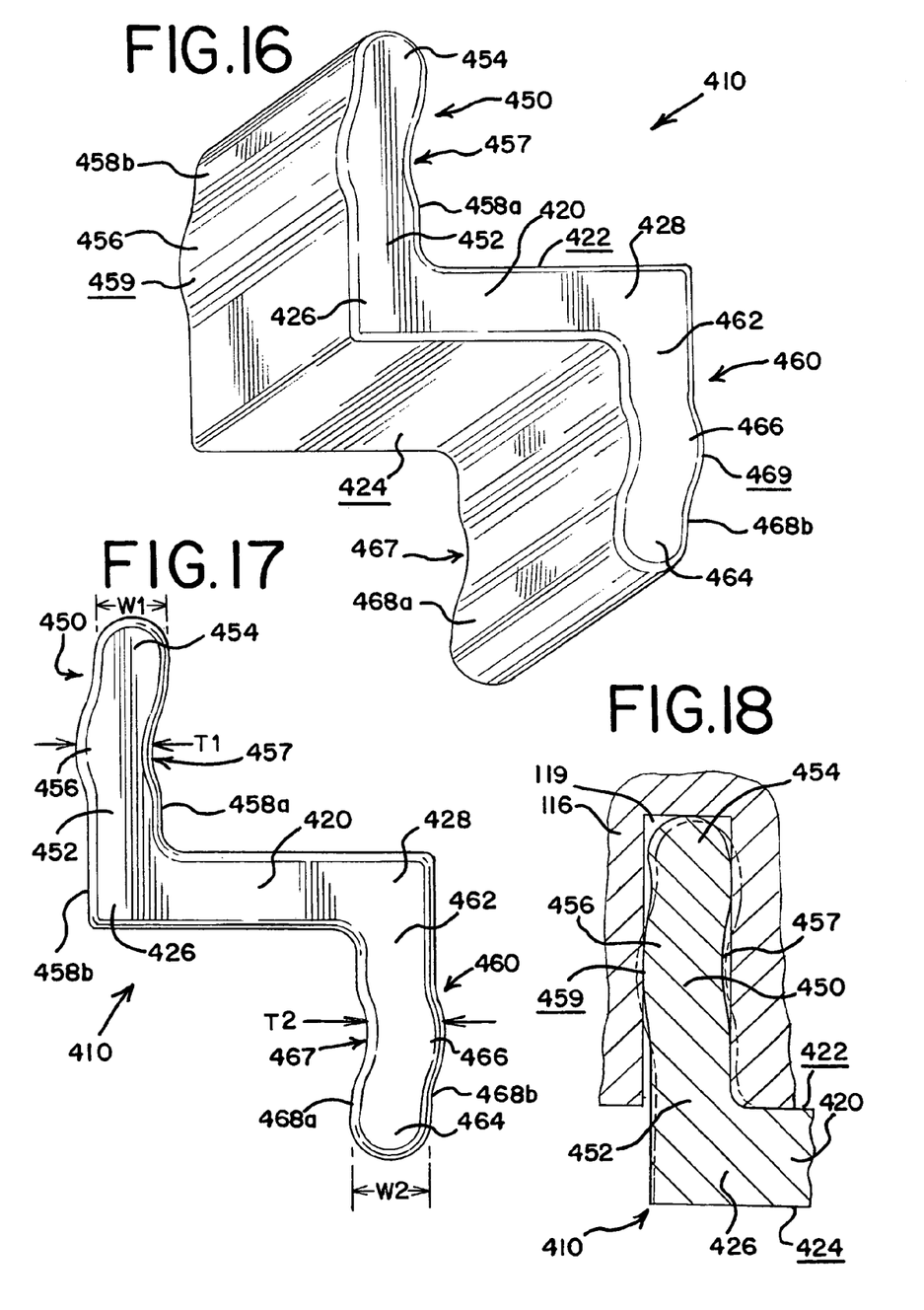
FIG. 16 is a perspective of a fourth embodiment of the connector of the invention.
FIG. 17 is an end view of the connector of FIG. 16.
FIG. 18 is a partial cross-section of the connector of FIG. 16 showing the connector installed in the channel of a trim member.

A fourth embodiment of the present invention is shown in FIGS. 16-18. There, the connector 410 comprises an intermediate or central member 420 and two fingers 450, 460. The central member 420 comprises a first surface 422, a second surface 424, a first end 426 and a second end 428. The first surface 422 is generally opposite and parallel to the second surface 424. The first end 426 is generally opposite the second end 428 of the central member 420.

The first finger 450 has a fixed end 452 and a free end 454. The first finger 450 extends from the first end 426 of the central member 420. Thus, the fixed end 452 of the first finger 450 is connected to the central member 420. Preferably, the fixed end 452 of the first finger 450 is proximate the first end 426 of the central member 420. Furthermore, the first finger 450 is positioned generally perpendicular to the central member 420, and extends from the first surface 422 of the central member 420. Similarly, the second finger 460 has a fixed end 462 and a free end 464. The second finger 460 extends from the second end 428 of the central member 420. Thus, the fixed end 462 of the second finger 460 is connected to the central member 420. Preferably, the fixed end 462 of the second finger 460 is proximate the second end 428 of the central member 420. Furthermore, the second finger 460 is positioned generally perpendicular to the central member 420 and extends from the second surface 424 of the central member 420. Thus, the second finger 460 is generally parallel to the first finger 450, but the fingers 450, 460 extend in opposite directions. Thus, the two fingers 450, 460 and the central member 420 generally form a "notched" or "stepped" configuration of the connector 410. The first and second fingers 450, 460 each have at least one protrusion 456, 466. The protrusion 456, 466 can be located along an inner edge 458a, 468a or an outer edge 458b, 468b. The protrusion 456, 466 can be located between the fixed end 452, 462 and the free end 454, 464. Each finger 450, 460 can have a recess 457, 467 located opposite the protrusion 456, 466. The protrusion 456, 466 defines an engaging surface 459, 469 that engages an extent of the channel 118 when the connector 410 is installed. The number and location of the protrusions 456, 466 varies with the design parameters of the connector 410.

Each of the flexible and resilient fingers 450, 460 has a generally curvilinear shape. The first finger 450 has an overall width W1, as shown in FIG. 17. The overall width W1 is the maximum dimension of the finger 250, in an unflexed state, measured in a direction generally parallel to the length of the central member 420. The first finger 450 also has a thickness T1, also shown in FIG. 17. The thickness T1 is measured parallel to the width W1. The thickness T1 represents the thickness of the finger 450 at any point between the free end 454 and the fixed end 452 of the finger 450. Thus, while the finger 450 will have a series of thicknesses T1 along its length, it will have only one overall width W1 representing the maximum dimensions of the finger 250 in the direction indicated in FIGS. 16 and 17. Similarly, the second finger 460 has an overall width W2, as shown in FIG. 17. The overall width W2 is the maximum dimension of the finger 260, in an unflexed state, measured in a direction generally parallel to the length of the central member 420. The second finger 460 also has a thickness T2, also shown in FIG. 17. The thickness T2 is measured parallel to the width W1. The thickness T2 represents the thickness of the finger 460 at any point between the free end 464 and the fixed end 462 of the finger 460. Thus, while the finger 460 will have a series of thicknesses T2 along its length, it will have only one overall width W1 representing the maximum dimensions of the finger 260 in the direction indicated in the FIGS. 16 and 17.

The installation, extraction and operation of the connector 410 is generally consistent with that of the previous connectors 10, 210, 310 described above. However, a difference resides in the offset of the two opposing fingers 450, 460 caused by the intermediate central member 420. Thus, the connector 410 is used with a closure device where the channel 118 in the support member 114 is offset from or not aligned with the channel 119 in the trim member 116, as shown in FIGS. 1B and 18. In such a situation, the second finger 260 is installed in the channel 118 in the support member 114 by applying an insertion force similar to that of the first preferred embodiment installation. Once the connector 410 is installed in the channel 118, the first finger 450 will be offset by the length of the central member 420. Thus, the trim member 116 can be installed by forcing the channel 119 of the trim member 116 over the exposed first finger 450 such that the first finger 450 is inserted into the channel 119.

Each of the fingers 450, 460 resiliently flexes due to the above described configuration. Because the widths W1, W2 are greater than the widths W10, W20 of the channels 118, 119, the fingers 450, 460 will necessarily confront the walls of the channel 118, 119, causing the fingers 450, 460 to flex. Furthermore, because the thicknesses T1, T2 of the fingers 450, 460 are smaller than the widths W10, W20 of the channels 118, 119 at all points, the entire length of the fingers 450, 460 can pass into the respective channel 118, 119 in which it is being inserted. The flexing of the fingers 450, 460 causes them to exert an outward force on the walls of the channels 118, 119, thereby causing an interference fit much like the previously described connectors. Referring to FIG. 18 showing the interference fit, the engaging surface 459 of the protrusion 456 engages an inner edge of the channel 119, and the recess 457 is spaced a distance from an opposite inner edge of the channel 119. Once the fingers 450, 460 are installed into the channels 118, 119, the trim member 116 is secured to the support member 114 via the connector 410. Each of the curvilinear fingers 450, 460 is adapted to resiliently flex when installed in their respective channels 118, 119.

Although the fingers 450, 460 are shown in the FIGS. 16-18 to possess several curves, the fingers 450, 460 can take on a variety of different configurations without departing from the spirit of the present invention. For example, the fingers 450, 460 can be "C-shaped" or "S-shaped" in configuration. Each finger 450, 460 only needs to have a curvilinear configuration such that the overall width W1, W2 of the finger 250, 260 is greater than the width W10, W20 of the channel 118, 119 in which it is being inserted while the thickness T1, T2 of the finger 450, 460 along its entire length from the free end 454, 464 to the fixed end 452, 462 remained less than the width of the channel W10, 20 at all points. This configuration will allow the entire length of the finger 450, 460 to enter the channel 118, while ensuring that a portion of the finger 450, 460 confronts the walls of the channel 118 in an interference fit.

Figures 19, 20, 21:
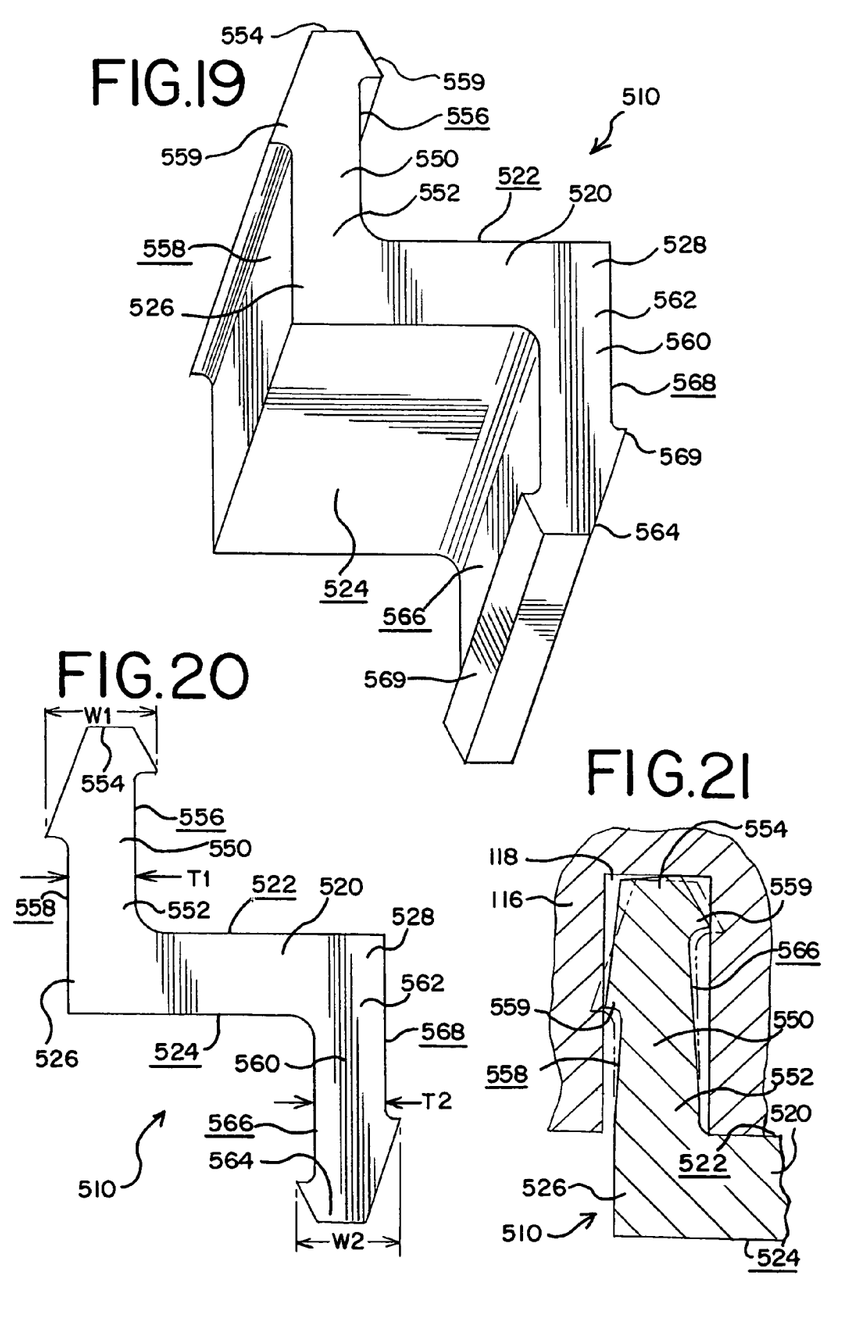
FIG. 19 is a perspective of a fifth embodiment of the connector of the invention.
FIG. 20 is an end view of the connector of FIG. 19.
FIG. 21 is a partial cross-section of the connector of FIG. 19 showing the connector installed in the channel of a trim member.

A fifth embodiment of the present invention is shown in FIGS. 19-20. There, the connector 510 comprises an intermediate or central member 520 and two fingers 550, 560. The central member 520 comprises a first surface 522, a second surface 524, a first end 526 and a second end 528. The first surface 522 is generally opposite and parallel to the second surface 524. The first end 526 is generally opposite the second end 528 of the central member 520. The first finger 550 has a fixed end 552 and a free end 554. The first finger 550 extends from the first end 526 of the central member 520. Thus, the fixed end 552 of the first finger 550 is connected to the central member 520. Preferably, the fixed end 552 of the first finger 550 is proximate the first end 526 of the central member 520. Furthermore, the first finger 550 extends generally perpendicular to the central member 520, and extends from the first surface 522 of the central member 520. The first finger 550 further includes a first surface 556 and a generally opposed second surface 558. Each of the surfaces 556, 558 includes a barb or protrusion 559. The protrusion 559 on the first surface 556 is proximate the free end 554 of the first finger 550, while the protrusion 559 on the second surface 558 is intermediate the free end 554 and the fixed end 552 of the first finger 550.

Similarly, the second finger 560 has a fixed end 562 and a free end 564. The second finger 560 extends from the second end 528 of the central member 520. Thus, the fixed end 562 of the second finger 560 is connected to the central member 520. Preferably, the fixed end 562 of the second finger 560 is proximate the second end 528 of the central member 520. Furthermore, the second finger 560 extends generally perpendicular to the central member 520 and extends from the second surface 524 of the central member 520. The second finger 560 further includes a first surface 566 and a generally opposed second surface 568. Each of the surfaces 566, 568 includes a barb or protrusion 569. The protrusion 569 on the first surface 566 is proximate the free end 564 of the second finger 560, while the protrusion 569 on the second surface 568 is intermediate the free end 564 and the fixed end 562 of the second finger 560. Thus, the second finger 560 is generally parallel to the first finger 550, but the fingers 550, 560 extend in opposite directions. Thus, the two fingers 550, 560 and the central member 520 generally form a "notched" or "stepped" configuration of the connector 510.

Each of the fingers 550, 560 has a generally straight configuration. The first finger 550 has an overall width W1, as shown in FIG. 20. The overall width W1 is the maximum dimension of the finger 550, in an unflexed state, measured in a direction generally parallel to the length of the central member 520. Generally, the overall width W1 is the distance from the peak of the protrusion 559 on the first surface 556 to the peak of the protrusion 559 on the second surface 558 measured in a direction parallel to the length of the central member 520. The first finger 550 also has a thickness T1, also shown in FIG. 20. The thickness T1 is measured parallel to the width W1. The thickness T1 represents the thickness of the finger 550 at any point between the free end 554 and the fixed end 552 of the finger 550. Thus, while the finger 550 will have a series of thicknesses T1 along its length, it will have only one overall width W1 representing the maximum dimensions of the finger 550 in the direction indicated in the FIGS. 19-21.

Similarly, the second finger 560 has an overall width W2, as shown in FIG. 20. The overall width W2 is the maximum dimension of the finger 560, in an unflexed state, measured in a direction generally parallel to the length of the central member 520. Generally, the overall width W1 is the distance from the peak of the protrusion 569 on the first surface 566 to the peak of the protrusion 569 on the second surface 568 measured in a direction parallel to the length of the central member 520. The second finger 560 also has a thickness T2, also shown in FIG. 20. The thickness T2 is measured parallel to the width W1. The thickness T2 represents the thickness of the finger 560 at any point between the free end 564 and the fixed end 562 of the finger 560. Thus, while the finger 560 will have a series of thicknesses 12 along its length, it will have only one overall width W1 representing the maximum dimensions of the finger 560 in the direction indicated in the FIGURES.

The installation, extraction, and operation of the connector 510 is generally consistent with that of the previous connectors 10, 210, 310, 410 described above. However, a difference results in the offset of the two opposing fingers 550, 560 caused by the intermediate central member 520. Thus, the connector 510 is used in a situation when the channel 118 in the support member 114 is offset from or misaligned with the channel 119 in the trim member 116, as shown in FIGS. 1B and 21. In such a situation, the second finger 560 is installed in the channel 118 in the support member by applying an insertion force similar to that of the first preferred embodiment installation. Once the connector 510 is installed in the channel 118, the first finger 550 will be offset or staggered by the length of the central member 520. Thus, the trim member 116 can be installed by forcing the channel 119 of the trim member 116 over the exposed first finger 550 such that the first finger 550 is inserted into the channel 119.

Each of the fingers 550, 560 resiliently flexes due to the above described configuration. Because the widths W1, W2 are greater than the width W10, W20 of the channel 118, 119, the fingers 550, 560 will necessarily confront the walls of the channel 118, 119, causing the fingers 550, 560 to flex. Furthermore, because the thicknesses T1, T2 of the fingers 550, 560 are smaller than the width W10, W20 of the channels 118, 119 at all points, the entire length of the fingers 550, 560 can pass into the respective channel 118, 119 in which it is being inserted. The flexing of the fingers 550, 560 causes them to exert an outward force on the walls of the channels 118, 119, thereby causing an interference fit much like the first preferred embodiment. Specifically, each of the protrusions 569 engages or "bites" into the walls of the channels 118, 119 to cause frictional engagement between the connector 510 and each of the support member 114 and trim member 116. Once the fingers 550, 560 are installed into the channels 118, 119, the trim member 116 is removable secured to the support member 114 via the connector 510. Each of the curvilinear fingers 550, 560 is adapted to resiliently flex when installed in their respective channels 118, 119.

Although the fingers 550, 560 are shown in the FIGS. 19-21 to possess several curves, the fingers 550, 560 can take on a variety of different configurations without departing from the spirit of the present invention. For example, the fingers 550, 560 can be "C-shaped" or "S-shaped" in configuration. Each finger 550, 560 only needs to have a curvilinear configuration such that the overall width W1, W2 of the finger 550, 260 is greater than the width W10, W20 of the channel 118 in which it is being inserted while the thickness T1, T2 of the finger 550, 560 along its entire length from the free end 254, 264 to the fixed end 552, 562 remained less than the width of the channel W10, W20 at all points. This configuration will allow the entire length of the finger 550, 560 to enter the channel 118, while ensuring that a portion of the finger 550, 560 confronts the walls of the channel 118 in an interference fit.

The connector 10 of the present invention provides many benefits over the prior art. Traditional trim members are connected to support members using glue, screws, or other destructive fasteners. Although glue is not typically visible, screw, nails and other fasteners are visible and can be aesthetically unappealing. Thus, if the trim member ever needed to be removed from the support member for repair or maintenance of the window assembly, removal of the trim member would often destroy it, requiring replacement of the trim members. For example, when the trim member was glued to the support member, removal could be accomplished by prying the two apart, thereby causing damage to the trim member, the support member, or both. One beneficial features of the present connector 10 is the ability to couple the trim member 116 to the support member 114 in a non-destructive and removable fashion thereby preventing damage to the members 114, 116.

Furthermore, the ease with which the trim member 116 can be installed on the closure assembly 100 is a major benefit of the present invention. Traditionally, application of glue to the trim members, or drilling and securing the trim members with screws, nails, or other fasteners took considerable time. With the connector 10 of the present invention, the trim member 116 can be installed on the support member 114 in much less time than traditional means of installation. Finally, the lightweight and resilient connector 10 can be reused upon removal from the installed position P1, which significantly increases the utility of the connector 10. This provides advantages of the traditional methods of installation, in that new fasteners and/or a new application of glue must be used to re-install a previously removed trim member.

While the specific embodiments and various details thereof have been illustrated and described, numerous modifications come to mind without significantly departing from the spirit of the invention and the scope of protection is only limited by the following claims.

What is claimed is:

1. A connector for joining frame members of a window assembly wherein each frame member has a channel to receive a portion of the connector, the connector comprising:
   a pair of spaced longitudinal members;
   a pair of transverse members attached to the longitudinal members to form a connector frame, wherein the frame has a front wall and a rear wall;
   two flexible fingers, comprising a first finger extending from one of the longitudinal members towards the other longitudinal member, and a second finger extending from the other of the longitudinal members, wherein a first portion of the first finger is positioned beyond the rear wall, and a second portion of the first finger is positioned beyond the front wall, and wherein a first portion of the second finger is positioned beyond the rear wall, and a second portion of the second finger is positioned beyond the front wall; and
   a rib separating the first finger and the second finger, wherein the rib is connected to both longitudinal members.

2. The connector of claim 1 wherein a rear surface of the first portion of the first finger is positioned beyond the rear wall and a front surface of first portion of the first finger is positioned between the front and rear walls.

3. The connector of claim 1 wherein a front surface of the second portion of the first finger is positioned beyond the front wall and a rear surface of the second portion of the first finger is positioned between the front and rear walls.

4. The connector of claim 1 wherein the front wall defines a front plane and the rear wall defines a rear plane.

5. The connector of claim 4 wherein the first portion of the finger intersects the rear plane.

6. The connector of claim 4 wherein the second portion of the first finger intersects the front plane.

7. The connector of claim 1 wherein the first finger has a fixed end and a free end, and wherein a clearance exists between the free end and the other longitudinal member.

8. The connector of claim 7 wherein the first finger is moveable between a first position and a second position, wherein the clearance in the first position is less than the clearance in the second position.

9. The connector of claim 1 wherein the first finger is moveable between a first position, wherein a first portion of the first finger is positioned beyond the rear wall and a second position, wherein the first portion of the first finger is positioned generally coincident with the rear wall.

10. The connector of claim 1 wherein the frame and the first finger are integrally formed of plastic.

11. The connector of claim 1 wherein the rib does not extend beyond the front wall or the rear wall of the frame.

12. A connector for joining frame members of a window assembly, wherein each frame member has a channel to receive the connector in an interference fit, the connector comprising:
    a frame formed from first and second longitudinal members joined with first and second transverse members, the frame having an upper surface and a lower surface;
    a first resilient finger extending from the first longitudinal member towards the second longitudinal member, wherein a clearance exists between a free end of the finger and the second longitudinal member;
    a second resilient finger extending from the second longitudinal member towards the first longitudinal member, wherein a clearance exists between a free end of the finger and the first longitudinal member; and,
    a rib separatin2 the first finger and the second finger, wherein the rib is connected to the first longitudinal member and the second longitudinal member,
    wherein each finger has a free end with an upper surface that extends beyond the upper surface of the frame, and wherein each finger has a fixed end with a lower surface that extends beyond the lower surface of the frame.

13. The connector of claim 12 wherein the rib does not extend beyond the upper surface or the lower surface of the frame.

* * * * *